Jan. 18, 1927.
P. H. BETHEA
BATTERY SWITCH
Filed August 3, 1925
1,615,106
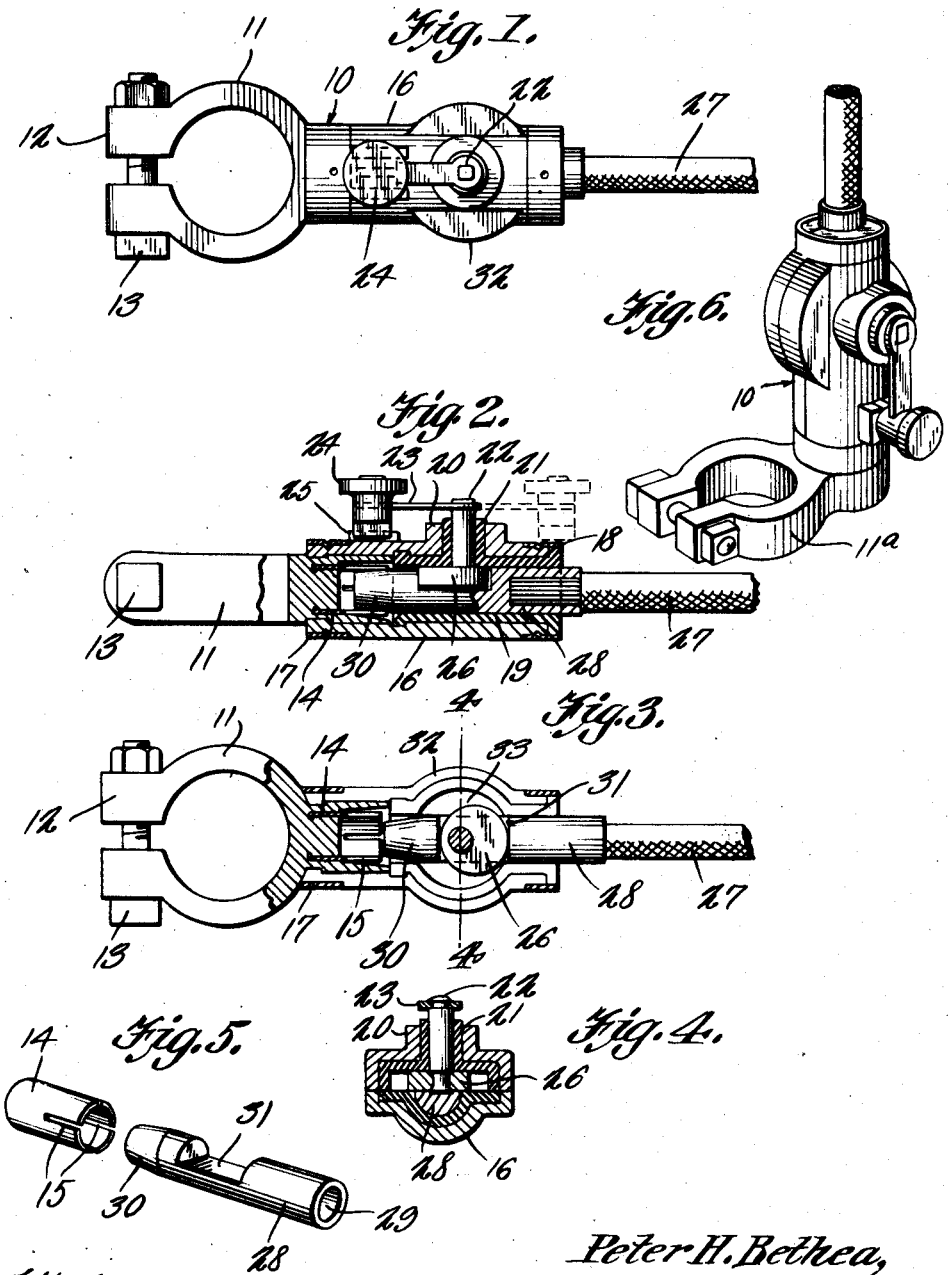
Peter H. Bethea,
INVENTOR
BY Victor J. Evans
ATTORNEY
WITNESS:

Patented Jan. 18, 1927.

1,615,106

UNITED STATES PATENT OFFICE.

PETER H. BETHEA, OF WASHINGTON, DISTRICT OF COLUMBIA.

BATTERY SWITCH.

Application filed August 3, 1925. Serial No. 47,951.

This invention relates to electrical devices, particularly to switches, and has for its object the provision of a novel switch designed particularly for use in connection with storage or other batteries for automobiles, radio apparatus and other purposes, the switch being so constructed and arranged as to be mounted locally upon or at the battery and being operable whereby to break the circuit positively and avoid current leakage and consequently drain upon the battery especially when left standing.

A more specific object is the provision of a switch device of novel construction whereby the actuation of the movable parts will be effected in a peculiar manner so as to insure a positive make and break of the circuit when such is desired.

An additional object is to provide a device of this character which will be simple and inexpensive in manufacture, easy to install and use, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:

Figure 1 is a plan view of the complete device.

Figure 2 is a longitudinal section therethrough, the parts being shown in circuit closing position.

Figure 3 is a plan view partly in section with the parts in circuit breaking position.

Figure 4 is a cross section on the line 4—4 of Figure 3, and

Figure 5 is a detail perspective view showing two elements.

Figure 6 is a perspective view of a modification.

Referring more particularly to the drawings, the numeral 10 designates a metallic body member formed with a clamp 11 of ring-like or other shape adapted to be engaged upon the terminal post of a storage battery or the like though obviously this clamp might be replaced by one of different formation for use in connection with other types of batteries, or in connection with a conductor leading from any other source of current, such details being immaterial and well within the scope of the invention. In the present instance, the clamp 11 is shown as of circular shape and of split ring-like formation terminating in ears 12 through which passes a clamping bolt 13, this arrangement being particularly advantageous for use in connection with a storage battery. Suitably secured to the body 10 as for instance by being embedded therein is a cylindrical socket member 14 which has its protruding end portion slit at intervals as shown at 15 in order to be resilient.

The numeral 16 designates a casing member of suitable insulating material which has one end secured upon the body 10 by any desired means and preferably provided with a reinforcing ferrule 17, though this is a mere mechanical detail. At the opposite end this casing is likewise provided with a ferrule 18 and suitably secured within the casing is a bushing 19. As a matter of fact the outer casing 16 might be constructed of metal whereas, in this event, the bushing 19 must be of insulating material, though it is obvious that any other arrangement may be provided if it has the equivalent effect. At one side the casing is formed with a boss 20 within which is a sleeve portion 21 on the bushing 19 constituting a bearing for a stem 22 which is rotatably mounted and which carries an arm 23 on which is an operating head or button 24 serving as a handle. Movement of the handle in one direction is limited by means of a stop 25 provided on the casing 16. Within the casing or rather within the confines of the bushing 19, the stem 22 carries a cam 26.

The numeral 27 designates a conductor upon one end of which is suitably secured a metallic member 28 having a socket 29 at one end receiving the conductor and having its other end tapered as shown at 30 so as to be capable of insertion within the slit member 14. Intermediate its ends the member 28 is formed with a recess or notch 31 within which the above described cam 26 is engaged. Obviously, the intermediate portion of the casing must be widened or enlarged as indicated at 32 to provide a chamber 33 within which the cam 26 may operate.

In the use of the device, it will be apparent that when the handle is in the position shown by full lines in Figure 2, the cam 26 engaged within the recess 31 will be in such position that the metallic member 28 will have its tapered end 30 engaged within the slit end of the member 14, thus closing the circuit from the battery to and through whatever apparatus is used in connection therewith. Whenever the battery is not in use and it is desired to cut off the current positively and avoid leaking along the line, it is merely necessary that the operator grasp the head or button 24 and swing the arm 20 into its other position shown by dotted lines in Figure 2, whereupon the rotation of the cam 26 engaged within the recess 31 will slide the member 28 longitudinally within the bushing 19 and retract the tapered ends 30 from engagement with the member 14, thus cutting off the current.

In Figure 6 of the drawings I have illustrated a slightly modified arrangement in which the clamping member 11$^a$ corresponding to the above described clamping member 11 is arranged at right angles to the body of the device, the advantage in this instance being that the clamp 11$^a$ may be engaged upon the upstanding terminal post of a storage battery or the like with the switch itself arranged in a vertical position instead of horizontally as will of course be the arrangement in the form disclosed in the other figures above described. Obviously, the construction and the operation of this modified form are identically the same as the first described form, the only difference being in the arrangement of parts.

From the foregoing description and a study of the drawings, it will be apparent that I have thus provided a simply constructed, inexpensive and very easily operated device for the purpose specified, and one which will possess great durability. It is believed that the operation, construction and advantages will be readily apparent to one skilled in the art without further explanation.

While I have shown and described the preferred embodiment of the invention, it should be understood that I reserve the right to make such changes in the form, construction, and arrangement of parts as will not depart from the spirit of the invention or the scope of the subjoined claims.

Having thus described the invention, I claim:—

1. In a switch device of the character described, a metallic body member formed with a terminal clamp adapted to be engaged upon the terminal element of a storage battery, said body member having a tubular portion, a split metallic sleeve embedded within said body member in spaced relation to the and within the confines of the tubular portion, a metallic casing member secured to said body, a liner of insulating material located within said casing member and immovable with respect thereto and including a bushing portion extending out through one side, a conductor, a metallic terminal element carried by the conductor and having a tapered end adapted to be forced within said split sleeve, said terminal element having a transverse groove in one side thereof, a shaft element journaled through said bushing and carrying a cam operating within said groove and carrying a handle located exteriorly of said casing, and stop means on the casing engageable by said handle for limiting movement thereof in both directions.

2. In a switch device of the character described, a metallic body member formed with a terminal clamp adapted to be engaged upon the terminal element of a storage battery, said body member having a tubular portion, a split metallic sleeve embedded within said body member in spaced relation to the and within the confines of the tubular portion, a metallic casing member secured to said body, a liner of insulating material located within said casing member and immovable with respect thereto and including a bushing portion extending out through one side, a conductor, a metallic terminal element carried by the conductor and having a tapered end adapted to be forced within said split sleeve, said terminal member having a transverse groove in one side thereof, a shaft element journaled through said bushing and carrying a cam operating within said groove and carrying a handle located exteriorly of said casing, and stop means on the casing engageable by said handle for limiting movement thereof in both directions, said casing and said liner being formed at one side to define a guide for said terminal member and being formed at an intermediate point with lateral extending portions accommodating said cam.

In testimony whereof I affix my signature.

PETER H. BETHEA.